(12) United States Patent
Kwok (10) Patent No.: US 7,512,794 B2
(45) Date of Patent: Mar. 31, 2009

(54) SYSTEM AND METHOD FOR AUTHENTICATION

(75) Inventor: Chung Y. Kwok, Irvine, CA (US)

(73) Assignee: Intersil Americas Inc., Milpitas, CA (US)

( * ) Notice: Subject to any disclaimer, the term of this patent is extended or adjusted under 35 U.S.C. 154(b) by 892 days.

(21) Appl. No.: 10/875,546

(22) Filed: Jun. 24, 2004

(65) Prior Publication Data

US 2005/0188200 A1     Aug. 25, 2005

Related U.S. Application Data

(60) Provisional application No. 60/547,144, filed on Feb. 24, 2004.

(51) Int. Cl.
*H04L 9/00* (2006.01)
*G06F 7/04* (2006.01)

(52) U.S. Cl. ............... 713/168; 713/171; 713/181; 726/2

(58) Field of Classification Search ............ 713/168, 713/170, 181; 726/2
See application file for complete search history.

(56) References Cited

U.S. PATENT DOCUMENTS

| | | | |
|---|---|---|---|
| 4,388,725 A | 6/1983 | Saito et al. | |
| 4,502,024 A | 2/1985 | Nishikawa et al. | |
| 4,611,335 A | 9/1986 | Arai et al. | |
| 4,746,898 A | 5/1988 | Loeppert | |
| 4,943,926 A | 7/1990 | Guzman-Edery et al. | |
| 5,638,448 A * | 6/1997 | Nguyen ............... | 380/29 |
| 5,727,447 A | 3/1998 | Shiraishi et al. | |
| 5,905,406 A | 5/1999 | Sugden et al. | |
| 7,280,629 B2 | 10/2001 | Dunning et al. | |
| 6,530,029 B1 | 3/2003 | Metchev | |
| 6,567,476 B2 | 5/2003 | Kohl et al. | |
| 6,777,975 B1 | 8/2004 | Dabral et al. | |
| 6,904,558 B2 * | 6/2005 | Cavanna et al. ......... | 714/781 |
| 6,990,042 B2 | 1/2006 | Stark | |
| 7,053,667 B1 | 5/2006 | Tang | |
| 7,290,196 B1 * | 10/2007 | Annayya et al. ......... | 714/758 |
| 2003/0061519 A1 * | 3/2003 | Shibata et al. ......... | 713/202 |
| 2004/0022546 A1 | 2/2004 | Cochran et al. | |
| 2004/0101060 A1 | 5/2004 | Simon et al. | |
| 2004/0264230 A1 | 12/2004 | Brand et al. | |
| 2006/0221175 A1 | 10/2006 | Shen et al. | |

FOREIGN PATENT DOCUMENTS

DE     102 16 396 A1     10/2003

OTHER PUBLICATIONS

Menezes et al.; "Handbook of Applied Cryptography, Chanllege-Response Identification (Strong Authentication)" 1997, Handbook of Applied Cryptography, CRC Press Series on Discrete Mathematics and its Applications, Boca Raton, Fl, CRC Press, US, pp. 397-404,490, XP002282273.

* cited by examiner

*Primary Examiner*—Benjamin E Lanier
(74) *Attorney, Agent, or Firm*—Howison & Arnott, L.L.P.

(57) ABSTRACT

An authentication process is performed by receiving a challenge and retrieving stored seed values. A response is generated based on the challenge and the seed values.

11 Claims, 7 Drawing Sheets

SYSTEM AND METHOD FOR AUTHENTICATION

CROSS-REFERENCE TO RELATED APPLICATIONS

This application claims priority on provisional application 60/547,144 filed on Feb. 24, 2004.

TECHNICAL FIELD OF THE INVENTION

This invention is related to an authentication protocol, in particular authentication using a challenge-response calculated using a cyclic redundancy code (CRC) function.

BACKGROUND OF THE INVENTION

Digital authentication can be an important part of modern systems. Authentication has uses in communication, transactions and devices. There are often trade-offs in authentication protocols between speed and security. It may be important to have an authentication system that may be performed quickly and still provide adequately secure authentication. What is therefore needed is an efficient system and method for calculating a secure authentication response.

SUMMARY OF THE INVENTION

An authentication process is performed by receiving a challenge and retrieving stored seed values. A response is generated based on the challenge and the seed values.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

Figure 1:
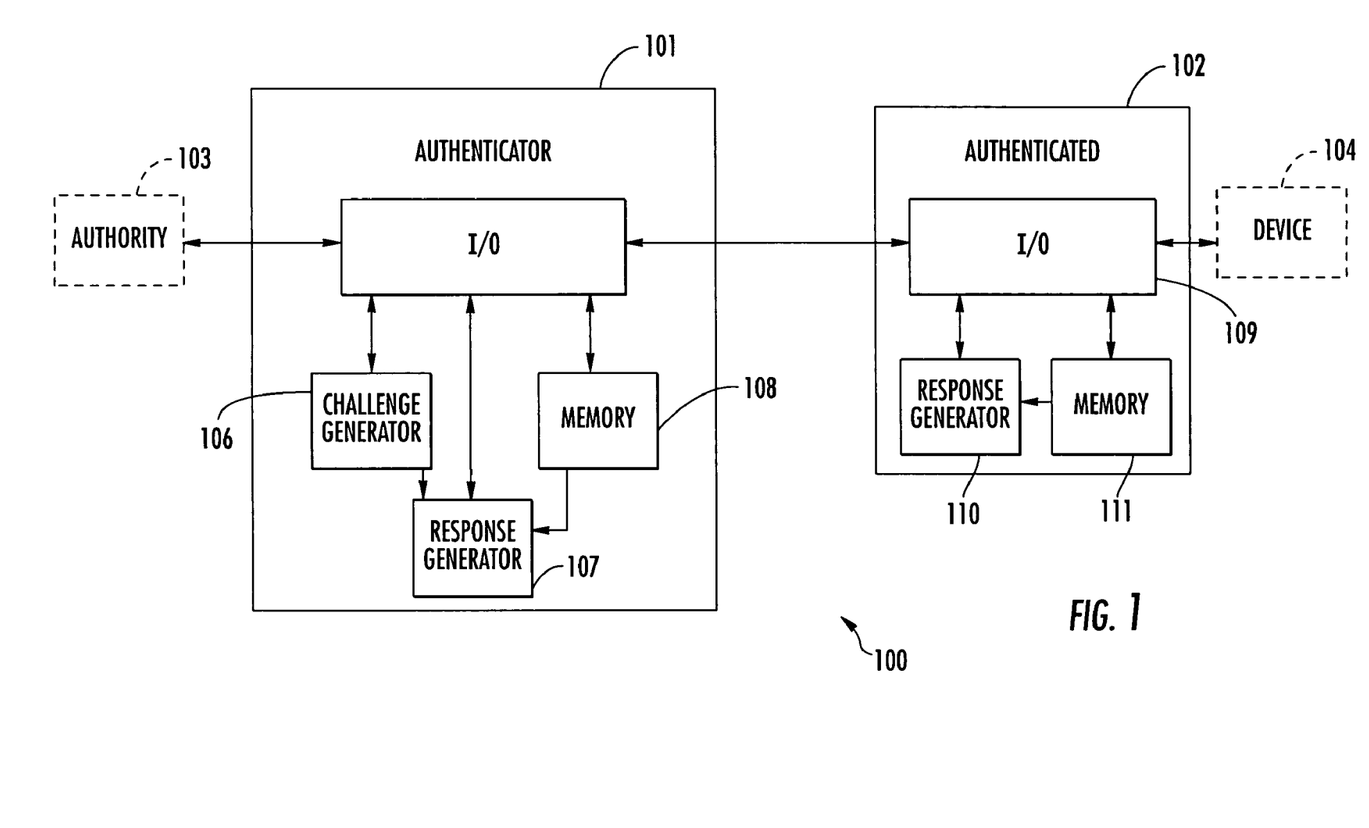
FIG. 1 illustrates a functional block diagram of a challenge-response authentication system.

With reference to FIG. 1, a functional block diagram of a challenge-response authentication system 100 is shown. The challenge-response authentication system 100 includes an authenticator unit 101 communicatively connected with an authenticated unit 102. Typically, the authenticator unit 101 may be connected to or integral with an authority 103. The authenticated unit 102 may be connected to or integral with a device 104. In some embodiments, the authenticator unit 101 may be sufficient without an authority 103. In some embodiments, the authenticated unit 102 may be sufficient without a device 104, particularly where the authenticated unit 102 is used to authenticate possession of the authenticated unit 102 as a token or key.

The authority 103 may be a system or resource that the device 104 may be communicably connected to if the device 104 is successfully authenticated to the authority 103. In accordance with the disclosed embodiment, the authority 103 may be a cellular telephone and the device 104 may be a cellular telephone battery. The authority 103 may be a computer network and the device 104 may be a computer. The authority 103 may be a lock and the device 104 or the authenticated unit may be a key.

In accordance with an embodiment, authenticator units 101 and authenticated units 102 may be distributed in pairs, allowing mutual authentication. These pair-distributed authenticator units 101 and authenticated units 102 may share resources or be implemented independently, depending on the specific security concerns of the embodiment. Because of the functional redundancies within the units, an authenticator unit 101 can substantially function as an authenticated unit 102 when such a configuration provides sufficient authentication security.

The authenticator unit 101 and authenticated unit 102 are depicted as containing functional elements. These functional elements may be implemented in software executed on a microprocessor, in one or more integrated circuits, discrete circuits or as a combination of software and hardware. For ease of discussion, these functional elements will be treated as though they were implemented independently of each other and communicably connected, although an actual implementation of the elements will typically vary from the described embodiment.

The authenticator unit 101 may include an authenticator I/O element 105, a challenge generator 106, an authenticator response generator 107 and an authenticator memory 108. In accordance with the disclosed embodiment, the authenticator I/O element 105 is connected to an authority 103, an authenticated unit 102, a challenge generator 106, an authenticator response generator 107 and an authenticator memory 108. The authenticator response generator 107 may be connected directly to the challenge generator 106 and the authenticator memory 108, or may be connected to those elements through the authenticator I/O element 105.

The authenticator unit 101 may include an authenticator I/O element 105. The authenticator I/O element 105 may control communication between the elements of the authenticator unit 101, the authenticated unit 102 and the authority 103. The authenticator I/O element 105 may include passive connection elements including one or more ports, jacks, wire connectors or other passive connection elements. The authenticator I/O element 105 may include active connection elements including processors, transmitters, receivers, modulators, demodulators, logic circuits, or other active connection elements. The authenticator I/O element 105 may include software connection elements to control the processing, transmission and reception of the communications.

The authenticator unit 101 may include a challenge generator 106. The challenge generator 106 may provide a sequence of bits for use as a challenge in the challenge-response authentication. The challenge generator 106 may provide the challenge to the authenticator response generator 107 and to the authenticator I/O element 105 for transmission to the authenticated unit 102. In accordance with one embodiment the challenge generator 106 is a pseudo-random number generator. The challenge generator 106 may be a random-number generator. The challenge may be formed in any way that produces a sequence of bits, including calculation from a seed or pass-phrase, a selected sequence of bits chosen from a predetermined set of challenge sequences stored in static memory or a pattern of sequences chosen from a dynamic memory, or any other suitable sequence of bits. The security of the authentication process will depend on the challenge generated, so the choice of challenge generator 106 may depend on the level of security required by the context of the authentication process. Typically, the strongest challenge will be derived from a true random-number generator.

In accordance with one embodiment, the challenge generator 106 provides a 32 bit random sequence. Where the challenge is only provided once in the authentication process in accordance with one embodiment, a true random sequence can be utilized. In accordance with another embodiment, a challenge may need to be recreated at another time, typically using a seed or pass-phrase, in which case a pseudo-random sequence may be necessary. In accordance with one embodiment, the challenge generator provides the challenge serially, although it will be obvious to those having skill in the art that a challenge may be provided by the challenge generator 106 in any format and converted to whatever format is required by the other elements.

The authenticator unit 101 may include an authenticator memory 108. In accordance with the disclosed embodiment, the authenticator memory 108 may be a secure memory such that the stored bits may not be read, accessed, discerned or altered without permission. In accordance with the disclosed embodiment, the authenticator memory 108 may be an electrically-erasable, programmable read-only memory (EEPROM). When sensitive data is stored in the authenticator memory 108, a lock-out bit may be fused so that unauthorized read/write access to the sensitive data is not possible or made generally difficult. An integrated circuit embodying the authenticator memory 108 may be designed to make probing or other physical methods of breaching the security of the authenticator memory 108 difficult. The sensitive data may be encrypted before being stored in the authenticator memory 108. As will be recognized by those skilled in the art, other forms of securing the sensitive data within authenticator memory 108 may be employed.

The authenticator memory 108 may store seed data. A given set of seed data may be associated with an authenticated unit 102. Several authenticated units 102 may each be associated with a different set of seed data. In accordance with one embodiment, the authenticator memory 108 may store authenticated unit identification data for unique authenticated units 102, each associated with substantially unique set of seed data.

The authenticator unit 101 may include an authenticator response generator 107. The authenticator response generator 107 receives a challenge from the challenge generator 106 and transforms the challenge to generate a sequence of bits that serves as the response in a challenge-response authentication protocol. The authenticator response generator 107 may receive seed data from the authenticator memory 108 for use in the transformation. The seed data may be associated with an authenticated unit 102 so that the response generated by the authenticator response generator 107 is associated with the authenticated unit 102.

Figure 2:
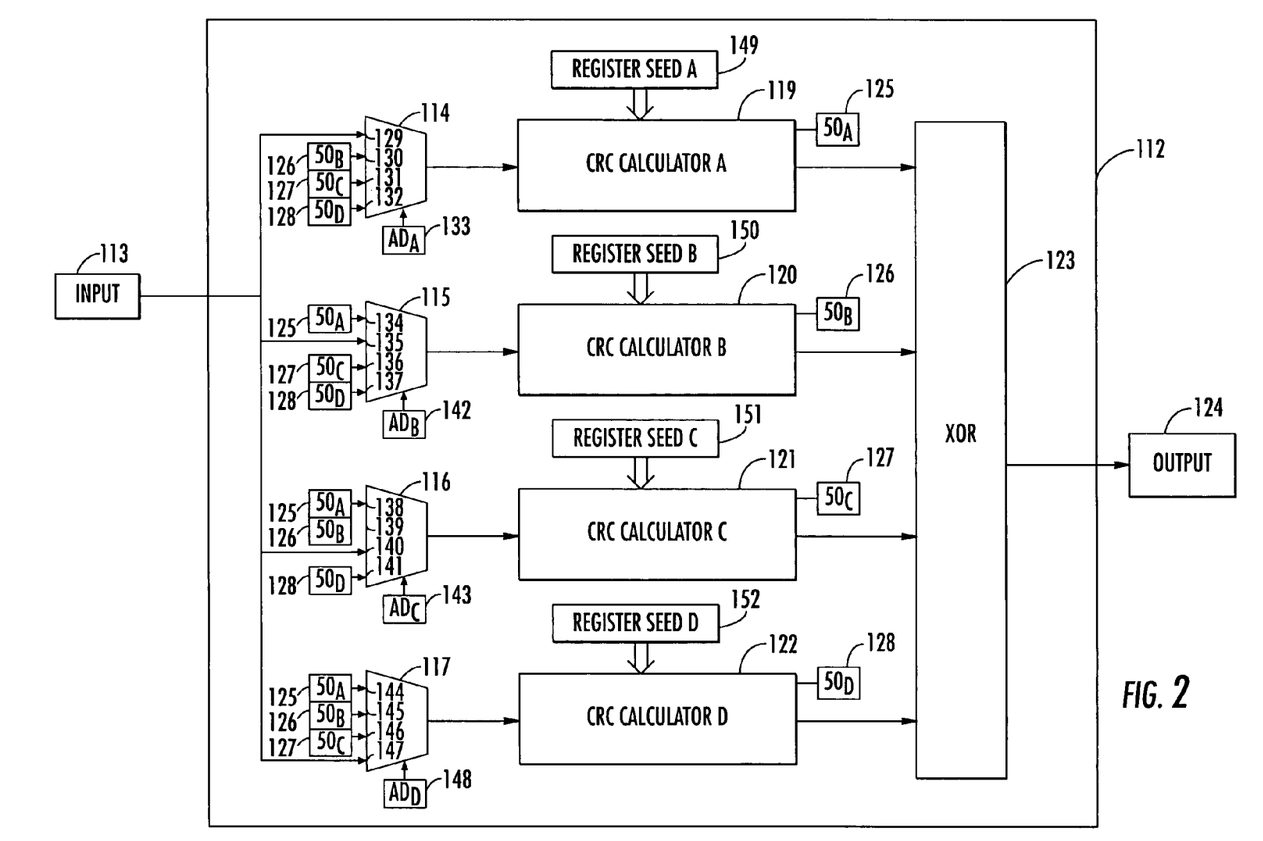
FIG. 2 illustrates a functional block diagram showing details of a response generator element.
Figure 7:
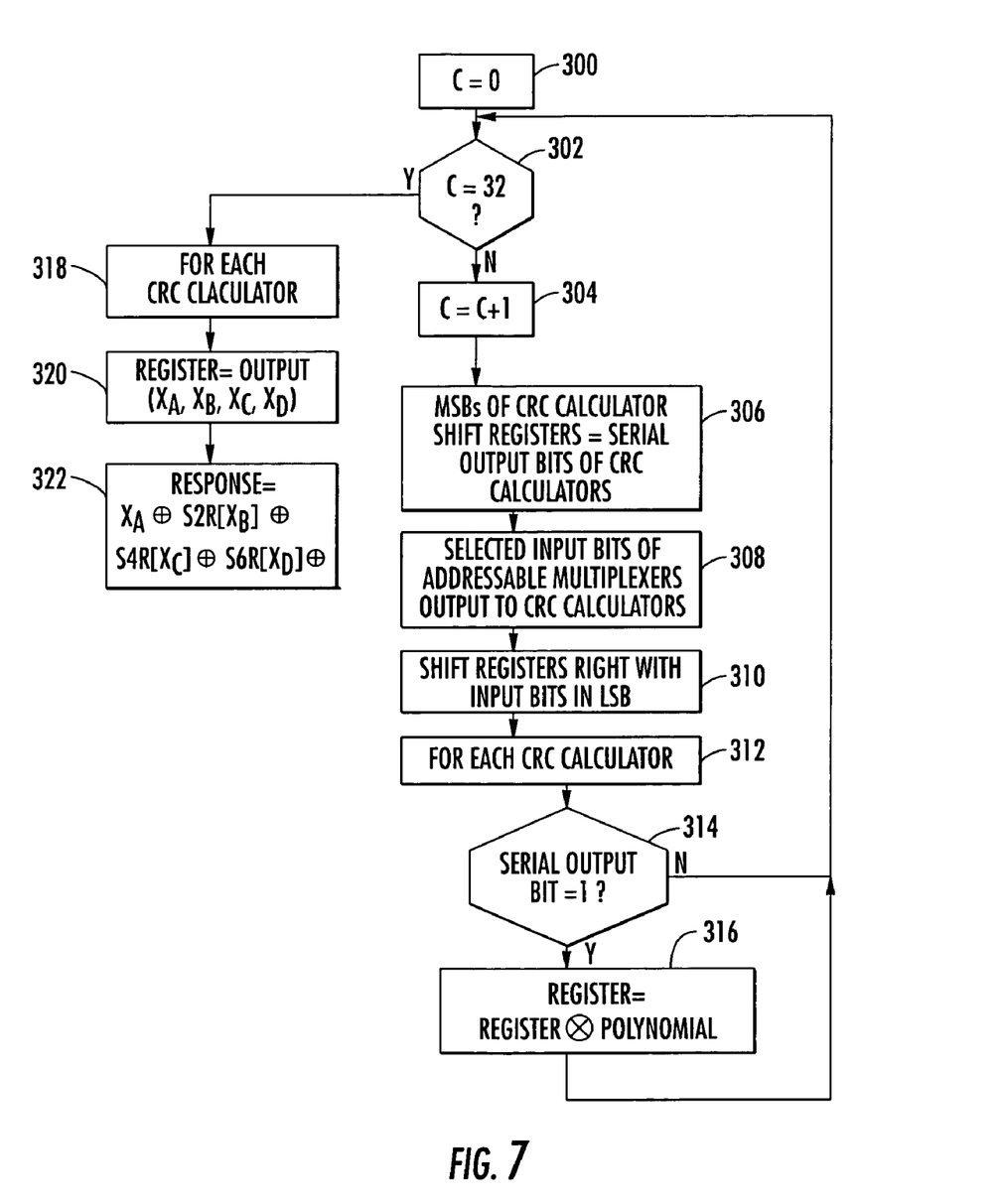
FIG. 7 illustrates a flow chart of a response calculation process.

Functionally, the authenticator response generator 107 may use any transformation function to generate the response. The strength and efficiency of the challenge-response authentication process depends largely on the transformation function used. In accordance with the described embodiment, the authenticator response generator 107 uses a transformation function that is derived from a plurality of independent cyclic-redundancy code functions. An authenticator response generator 107 using a specific transformation function in accordance with one embodiment is described with reference to figures two and seven.

The authenticated unit 102 may include an authenticated I/O element 109, an authenticated response generator 110 and an authenticated memory 111. In accordance with the disclosed embodiment, the authenticated I/O element 109 is connected to a device 104, an authenticator unit 101, an authenticated response generator 110 and an authenticated memory 111. The authenticated response generator 110 may be connected directly to the authenticated memory 111, or may be connected to the authenticated memory 111 through the authenticated I/O element 109.

The authenticated unit 101 may include an authenticated I/O element 109. The authenticated I/O element 109 may control communication between the elements of the authenticated unit 102, the authenticator unit 101 and the device 104. The authenticated I/O element 109 may include passive connection elements including one or more ports, jacks, wire connectors or other passive connection elements. The authenticated I/O element 109 may include active connection elements including processors, transmitters, receivers, modulators, demodulators, logic circuits, or other active connection elements. The authenticated I/O element 109 may include software connection elements to control the processing, transmission and reception of the communications.

The authenticated unit 102 may include an authenticated memory 111. In accordance with the disclosed embodiment, the authenticated memory 111 may be a secure memory such that the stored bits may not be read, accessed, discerned or altered without permission. In accordance with the disclosed embodiment, the authenticated memory 111 may be an electrically-erasable, programmable read-only memory (EEPROM). When sensitive data is stored in the authenticated memory 111, a lock-out bit may be fused so that unauthorized read/write access to the sensitive data is not possible or made generally difficult. An integrated circuit embodying the authenticated memory 111 may be designed to make probing or other physical methods of breaching the security of the authenticated memory 111 difficult. The sensitive data may be encrypted before being stored in the authenticated memory 111. As will be recognized by those skilled in the art, other forms of securing the sensitive data within authenticated memory 111 may be employed.

The authenticated unit 102 may include an authenticated response generator 110. The authenticated response generator 110 receives a challenge from the authenticated I/O element 109 and transforms the challenge to generate a sequence of bits that serves as the response in a challenge-response authentication protocol. Typically the transform function performed by the authenticated response generator 110 is identical to the transform function performed by the authenticator response generator 107. In accordance with another embodiment, the transform function of the authenticated response generator 110 is the inverse or otherwise related to the transform function of the authenticator response generator 107.

The authenticated response generator 110 may receive seed data from the authenticated memory 111 for use in the transformation.

Functionally, the authenticated response generator 110 may use any transformation function to generate the response. The strength and efficiency of the challenge-response authentication process depends largely on the transformation function used. In accordance with the described embodiment, the authenticated response generator 110 uses a transformation function that is derived from a plurality of independent cyclic-redundancy code functions. An authenticated response generator 110 using a specific transformation function in accordance with one embodiment is described with reference to figures two and seven.

The authenticator unit 101 and the authenticated unit 102 communicate with each other through the authenticator I/O element 105 and the authenticated I/O element 109. Typically, the communication is established by a direct connection of physical electrically conductive contacts. As will be recognized by those skilled in the art, other forms of communication may be implemented as appropriate to the context of the authentication process. The communication may be performed using communication lines or wireless communication. The communication may be established using a packet-based network protocol, optical signaling or mechanical signals. The communication may be performed using more than one method of communication, as appropriate.

With reference to FIG. 2, a functional block diagram of a response generator 112 in accordance with one embodiment is shown. The response generator 112 may be used as authenticator response generator 105 and authenticated response generator 110 as shown in FIG. 1. Although response generator 112 is depicted as being implemented using discrete functional components, those skilled in the art will recognize that the actual implementation may be made from discrete components, integrated into a single integrated circuit, performed in software running on a processor or a combination of various hardware and software components. As well, the implementations of a response generator 112 as an authenticator generator 105 may differ from the implementation as an authenticated response generator 110 while functionally the same.

The response generator 112 typically receives an input bit stream from input 113. In accordance with the disclosed embodiment, the input bit stream is the challenge of the challenge-response authentication protocol. The function of input 113 may be performed by the challenge generator 106, the authenticator I/O element 105 or the authenticated I/O element 109. The input 113 provides the challenge bit stream to an input of a set of multiplexers 114, 115, 116 and 117.

In accordance with the disclosed embodiment, the response generator 112 includes four multiplexers 114, 115, 116 and 117. Each of the four multiplexers 120, 121, 122 and 123 includes a set of addressable inputs. In accordance with the disclosed embodiment, the multiplexers each have four addressable inputs. The first multiplexer 114 includes addressable inputs 129, 130, 131 and 132. The second multiplexer 115 includes addressable inputs 134, 135, 136 and 137. The third multiplexer 116 includes addressable inputs 138, 139, 140 and 141. The fourth multiplexer 117 includes addressable inputs 144, 145, 146 and 147.

Each of the multiplexers 114, 115, 116 and 117 includes a two-bit address input 133, 142, 143 and 148. By applying two-bit input codes $AD_A$, $AD_B$, $AD_C$, and $AD_D$ to the two-bit address inputs 133, 142, 143 and 148, the multiplexer 114, 115, 116 and 117 selects one of the addressable inputs for output. For example, multiplexer 114 includes addressable inputs 129, 130, 131 and 132. When $AD_A$ is set equal to 00 and is applied to the address input 133, the input signal at input 129 is output from the multiplexer 114. When $AD_A$ is set equal to 01 and is applied to the address input 133, the input signal at input 130 is output from the multiplexer 114. Similarly, each addressable input of each multiplexer may be selected by applying the appropriate address code to an appropriate address input. The input codes are typically received from secured memory, such as authenticator memory 108 or authenticated memory 111.

The output of each multiplexer 114, 115, 116 and 117 is input bit-wise into one of a set of CRC calculators 119, 120, 121 and 122, respectively. The CRC calculators 119, 120, 121 and 122 are each initialized with a register seed 149, 150, 151 and 152 respectively. The register seeds 149, 150, 151 and 152 are typically received from a secure memory, such as authenticator memory 108 or authenticated memory 111.

In accordance with the disclosed embodiment, the CRC calculators 119, 120, 121 and 122 operate on each bit of the challenge in a serial fashion. With each calculation cycle, a bit of the challenge sequence is input to one of the inputs of each multiplexer 114, 115, 116 and 117. With each calculation cycle, a serial output bit $SO_A$ 125, $SO_B$ 126, $SO_C$ 127, and $SO_D$ 128 is output from each of the respective CRC calculators 119, 120, 121 and 122. In accordance with the disclosed embodiment, the serial output bits 125, 126, 127 and 128 are fed back to the addressable inputs of the multiplexers 114, 115, 116 and 117.

The feedback of the serial output bits 125, 126, 127 and 128 from the CRC calculators 119, 120, 121 and 122 to the addressable inputs of the multiplexers 114, 115, 116 and 117 may be patterned to provide greater unpredictability in the final output of the response generator 112. In accordance with the disclosed embodiment, the input 113 is fed to the first addressable input 129 of the first multiplexer 114, the second addressable input 135 of the second multiplexer 115, the third addressable input 140 of the third multiplexer 116 and the fourth addressable input 147 of the third multiplexer 117. The serial output bit 125 of the first CRC calculator 119 is fed to the first addressable input 134 of the second multiplexer 115, the first addressable input 138 of the third multiplexer 116 and the first addressable input 144 of the fourth multiplexer 117. The serial output bit 126 of the second CRC calculator 120 is fed to the second addressable input 130 of the first multiplexer 114, the second addressable input 139 of the third multiplexer 116 and the second addressable input 145 of the fourth multiplexer 117. The serial output bit 127 of the third CRC calculator 121 is fed to the third addressable input 131 of the first multiplexer 114, the third addressable input 136 of the second multiplexer 115 and the third addressable input 146 of the fourth multiplexer 117. The serial output bit 128 of the fourth CRC calculator 122 is fed to the fourth addressable input 132 of the first multiplexer 114, the fourth addressable input 137 of the second multiplexer 115 and the fourth addressable input 141 of the third multiplexer 116. Those skilled in the art will recognize that other feedback patterns could be implemented.

When the entire input bit-sequence provided by input 113 has been processed by the CRC calculators 119, 120, 121 and 122, an eight-bit output sequence is output from each CRC calculator 119, 120, 121 and 122 respectively. The eight-bit output sequences are input into an exclusive-or element 123 which performs a bit-wise exclusive-or function on the eight-bit output sequences to generate an eight-bit response sequence where the first bit of the response sequence is the exclusive-or of the first bit of each of the eight-bit output sequences and so forth. In accordance with another embodiment, the eight-bit output sequences are shifted relatively, such that the second output sequence is right-shifted by two bits relative to the first output sequence, the third output sequence is right-shifted by four bits relative to the first output sequence and the fourth output sequence is right-shifted by six bits relative to the first output sequence. The shifted output sequences are then combined to form an eight-bit response sequence. The response is provided at output element 124, typically as a serial message signal. The output element 124 may be authenticator I/O element 105 when the response generator 112 is used as an authenticator response generator 107. The output element 124 may be authenticated I/O element 109 when the response generator 112 is used as an authenticated response generator 110.

Figure 3:
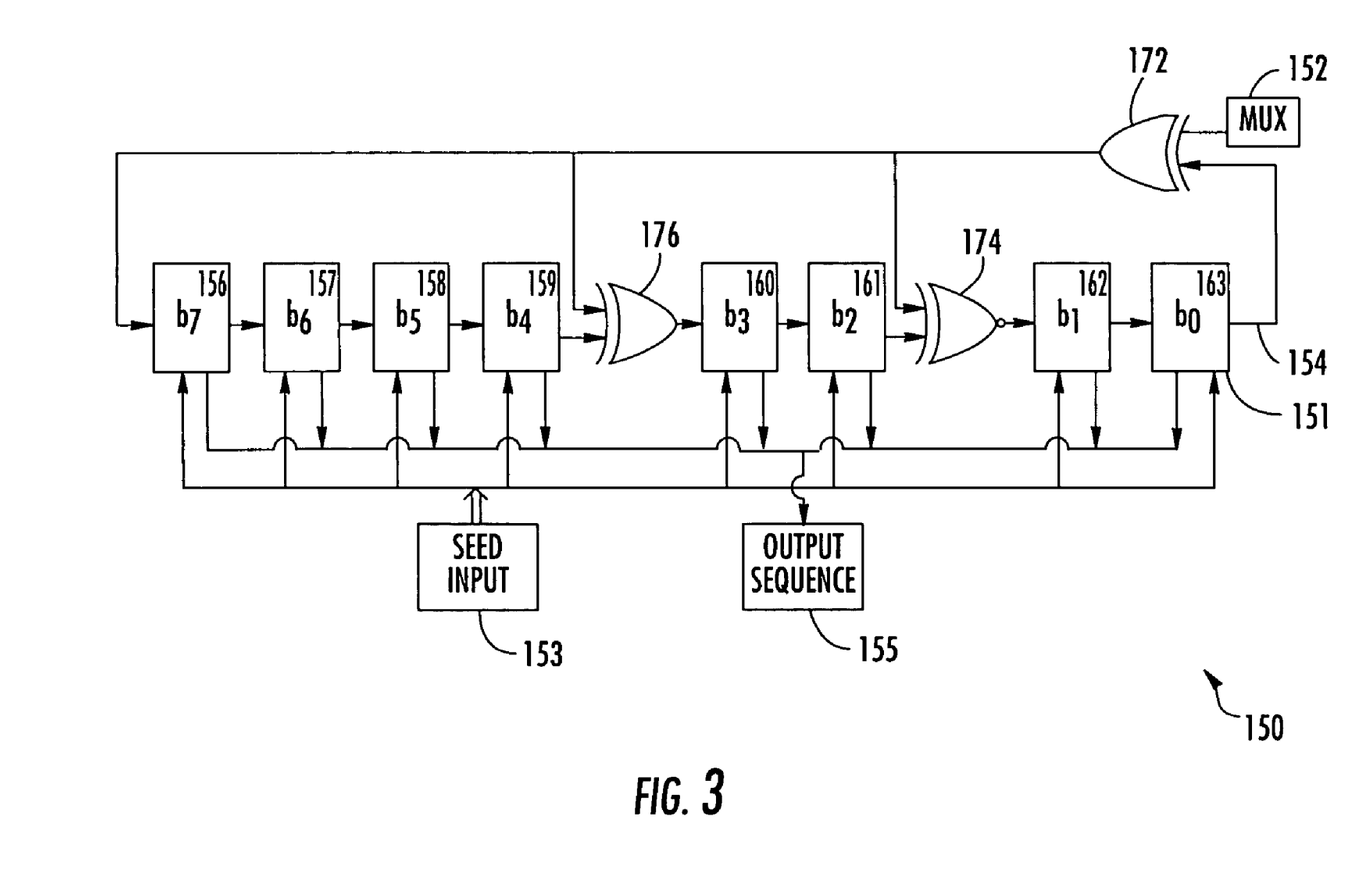
FIG. 3 illustrates a flow chart of an initialization process for a challenge-response authentication system.

With reference to FIG. 3, a functional block diagram of a CRC calculator 150 in accordance with the disclosed embodiment is shown. Although the functional block diagram of the CRC calculator 150 is shown as implemented with discrete elements, it will be recognized by those skilled in the art that the functions of the CRC calculator 150 may be rendered in other implementations. The functions may be implemented in one or more integrated circuits, logic circuits, software running on a processor or combinations of these implementation components. The specific manner of implementation may depend on the parameters and context of the embodiments. It will be recognized by those having skill in the art that there are other known manners of implementing a CRC calculator 150 beside the shift-register model, and that in particular, a CRC calculator 150 may be implemented using a look-up table. Any specific implementation of a CRC calculator 150 may be chosen if the outputs necessary to the embodiment are available.

The CRC calculator 150 includes a shift register 151 containing register locations 156, 157, 158, 159, 160, 161, 162 and 163. In accordance with the disclosed embodiment, the shift register 151 includes eight register locations. It will be recognized by those skilled in the art that CRC calculators 150 having more or less than eight register locations can be used. The shift register stores a bit b in each register location, such that a first bit $b_7$ is stored in a first register location 156, a second bit $b_6$ is stored in a second register location 157, a third bit $b_5$ is stored in a third register location 158, a fourth bit $b_4$ is stored in a fourth register location 159, a fifth bit $b_3$ is stored in a fifth register location 160, a sixth bit $b_2$ is stored in a sixth register location 161, a seventh bit $b_1$ is stored in a seventh register location 162 and an eighth bit $b_0$ is stored in a eighth register location 163. With each calculation cycle, the bit $b_0$ stored in the eighth register location 163 is output as the serial output 154, the bit $b_1$ stored in the seventh register location 162 is moved into the eighth register location 163, the bit $b_2$ stored in the sixth register location 161 is moved into the seventh register location 162, the bit $b_3$ stored in the fifth register location 160 is moved into the sixth register location 161, the bit $b_4$ stored in the fourth register location 159 is moved into the fifth register location 160, the bit $b_5$ stored in the third register location 158 is moved into the fourth register location 159, the bit $b_6$ stored in the second register location 157 is moved into the third register location 158, the bit $b_7$ stored in the first register location 156 is moved into the second register location 157, and an input bit from serial input 152 is combined (exclusive-or 172) with the serial output bit 154 and moved into the first register location 156.

Each of the register locations 156, 157, 158, 159, 160, 161, 162 and 163 initially store a seed bit input from seed input 153. In the disclosed embodiment, the seed input 153 is an authenticator memory 108 or an authenticated memory 111.

The CRC calculator 150 uses a polynomial code p to calculate an output sequence 155. In accordance with the disclosed embodiment, the polynomial code p is an six-bit binary code represents a three-bit positive power and a three-bit negative power. The positive power locates the position of a positive feedback term, an exclusive-or function 176, in the bit sequence of the CRC register 151. A zero represents no positive feedback term. The negative power locates the position of a negative feedback term, an exclusive-nor function 174, in the bit sequence of the CRC register 151. A zero represents no negative feedback term. In the disclosed embodiment, the three-bit positive power is 2 and the three bit negative power is 4.

In accordance with the standard CRC calculation, when the serial output bit 154 is equal to a "1," each bit stored in the shift register 151 is added (where binary adding is equal to the exclusive-or function and binary subtraction is equal to the exclusive-nor function) to the corresponding bit of the polynomial represented by p. In accordance with the disclosed embodiment, the exclusive-or 176 and the exclusive-nor 174 operate on the respective bits in accordance with their position and the exclusive-or of the serial output bit and the serial input bit.

After the final bit from the serial input 152 has been shifted into the first register location 156 and the polynomial has been added to the contents of the shift register where appropriate, the final contents of the shift register are received by output 155.

Figure 4:
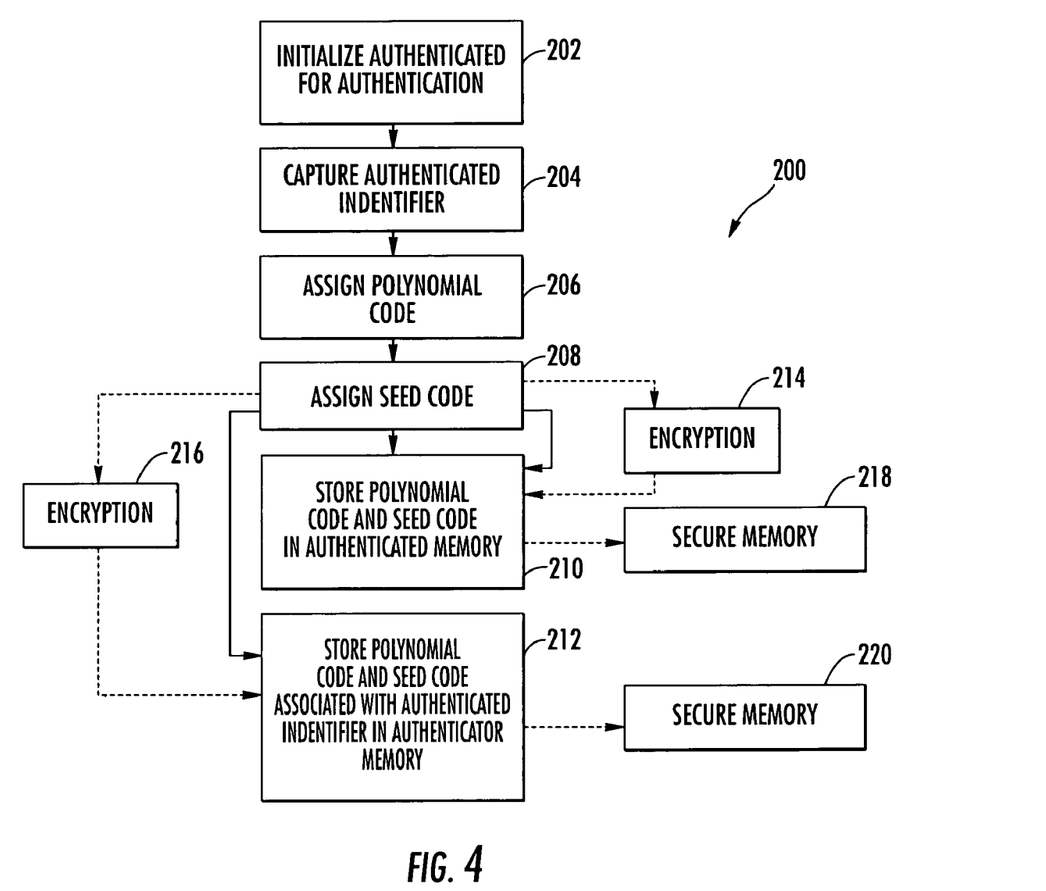
FIG. 4 illustrates a flow chart of a challenge-response authentication process in a challenge-response authentication system.

With reference to FIG. 4, a flow chart for the initialization 200 of an authenticated unit 102 with an authenticator unit 101 is shown. The authenticated unit 102 is communicably connected to an authenticator unit 101 to initialize the authenticated unit 102 in function block 202. Those having skill in the art will recognize that the authenticator unit 101 in this initialization protocol need not physically be the same authenticator unit 101 that performs the authentication protocol. The initialization protocol requires continuity of information stored, rather than physical identity.

The authenticator unit 101 may capture an authenticated identification code associated with the authenticated unit 204 in function block 204. The authenticated identification code may be read from the authenticated memory 108 or may be concurrently assigned to the authenticated unit 102 and stored in the authenticated memory 108. The authenticated identification code may identify a particular authenticated unit 102 or may identify a class or type of authenticated units. In accordance with another embodiment, where the initialization is not tailored to a specific authenticated unit 101 or authenticated unit type, an authenticated identification code may not be used and the step may be omitted.

The process proceeds to function block 206 where the authenticator unit 101 assigns a polynomial code. Typically the polynomial code is chosen from a set of predetermined polynomial codes. The polynomial code may be chosen from the set of predetermined polynomial codes randomly or in accordance with a predetermined pattern. The polynomial code may be generated randomly or in accordance with a polynomial code generation protocol. In accordance with the disclosed embodiment, the polynomial code is an eight-bit binary code. Those skilled in the art will recognize that a polynomial code appropriate to a given implementation may be larger or smaller than eight bits, or may be represented in other forms as appropriate.

The process proceeds to function block 208 where a seed code is assigned. Typically the seed code is generated randomly. The seed code may be chosen from a set of predetermined seed codes. The seed code may be chosen from a set of predetermined seed codes randomly or in accordance with a predetermined pattern. In accordance with the disclosed embodiment, the seed code is an eight-bit binary code. Those skilled in the art will recognize that a seed code appropriate to a given implementation may be larger or smaller than eight bits, or may be represented in other forms as appropriate.

The process proceeds to function blocks 210 and 210. In function block 210, the polynomial code and seed code are stored in the authenticated memory 111. In function block 212, the polynomial code and seed code are stored in the authenticator memory 108. Where an authenticated identification code has been associated with the authenticated unit 102, the polynomial code and seed code are stored in the authenticator memory 108 in association with the authenticated identification code. The polynomial code and seed code may be encrypted in function block 214 before they are stored in the authenticated memory 111 in function block 210. The polynomial code and seed code may be encrypted in function block 216 before they are stored in the authenticator memory 108 in function block 212. The authenticated identification code may also be encrypted at function block 216, depending on security considerations and implemented data recovery techniques.

When the polynomial code and seed code have been stored in the authenticated memory 108 in function block 210, the process may proceed to function block 218 where the data stored within the authenticated memory 111 is secured. The step of securing the data within the authenticated memory 111 may involve digital security measure, physical security measure or both. Those skilled in the art will recognize that the authenticated memory 111 may be secured before this point and further security measures may follow.

When the polynomial code and seed code have been stored in the authenticator memory 105 in function block 212, the process may proceed to function block 220 where the data stored within the authenticator memory 108 is secured. The step of securing the data within the authenticator memory 108 may involve digital security measure, physical security measure or both. Those skilled in the art will recognize that the authenticator memory 108 may be secured before this point and further security measures may follow.

Figure 5:
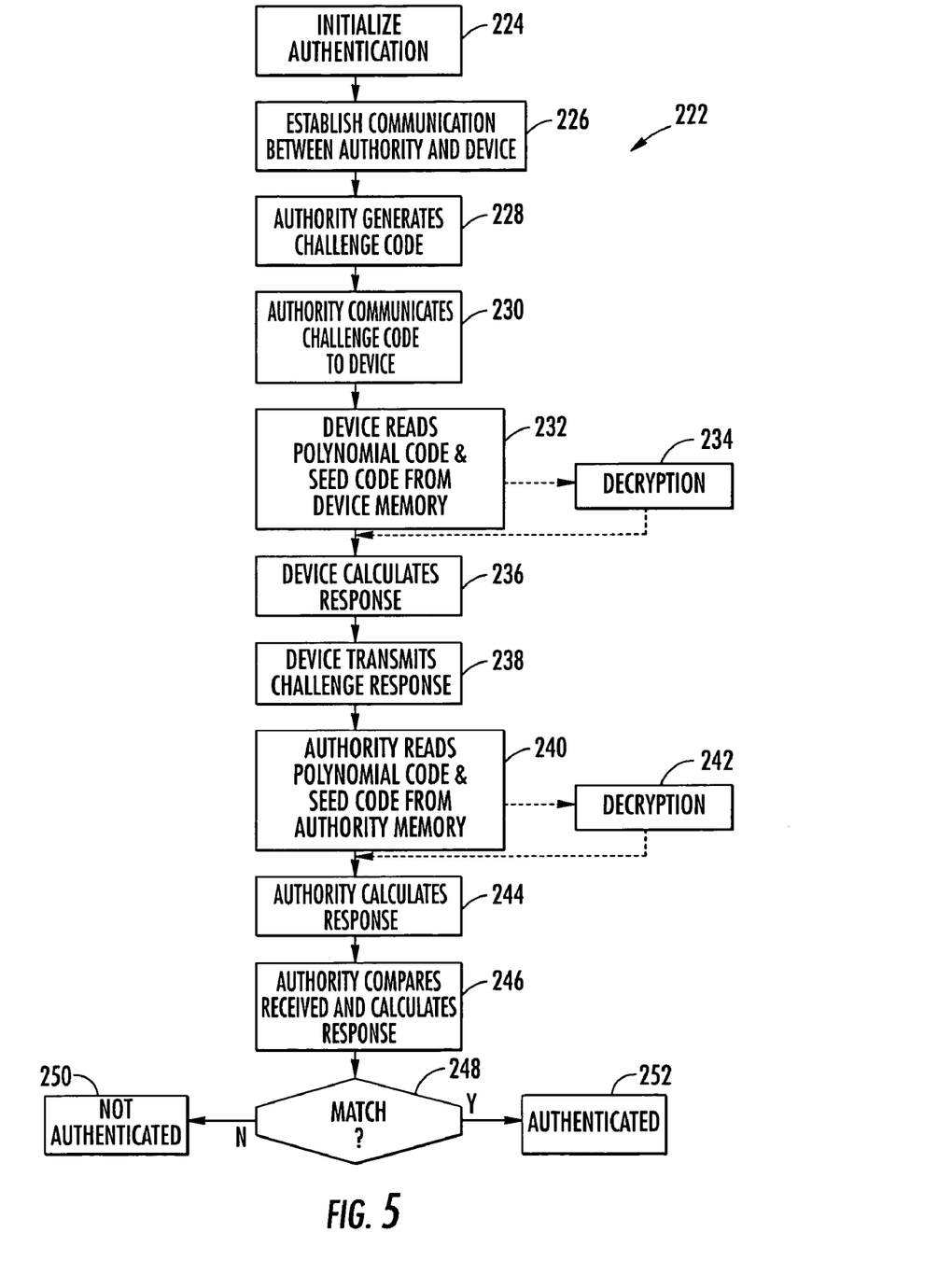
FIG. 5 illustrates a flow chart of an authentication initialization process within the challenge-response authentication process.

With reference to FIG. 5, a flow chart of an authentication process 222 for authenticating an authenticated unit 102 or device 104 to an authenticator unit 101 or authority 103. The authentication is initialized in function block 224. The process proceeds to function block 226 where communication is established between the authority 103 and the device 104. Typically communication between the authority 103 and the device 104 is established by direct connection of the authenticator I/O element 105 with the authenticated I/O element 109.

The process proceeds to function block 228 where the authority 103 generates a challenge code. In accordance with the disclosed embodiment, the challenge code is generated by the challenge generator 106. The authority 103 sends the challenge code to the device 104 in function block 230.

The device 104 reads the polynomial code and seed code stored at the device 104 and inputs the polynomial code and seed code into the authenticated response generator 110 at function block 232. Typically, this step will be performed as part of the authentication initialization at function block 224 or subsequently before the response calculation. The polynomial code and seed code may be decrypted as necessary in function block 234.

Using the polynomial code, the seed code and the challenge code, the device 104 calculates a response at function block 236. In accordance with the disclosed embodiment, the response is calculated using the authenticated response generator 110. The device 104 transmits a challenge response to the authority 103 at function block 238.

The authority 103 reads the polynomial code and seed code from an authority memory 108 in function block 240. Where the polynomial code and seed code in authority memory 108 is stored in association with an authenticated identification code, the authority 103 receives the authenticated identification code and reads the associated polynomial code and seed code from the authority memory 108. When the polynomial code and seed code have been stored in an encrypted form, the codes are decrypted at function block 242. Using the challenge code, the polynomial code and the seed code, the authority 103 calculates the response code at function block 244. In accordance with the disclosed embodiment, the authority 103 calculates the response code with the authenticator response generator 107.

The authority 103 compares the response code from the challenge response received from the device 104 with the response code calculated by the authority 103 at function block 246. If the received and calculated response codes are equal at decision block 248, the process follows the YES path to function block 252 where the device authentication status is established as authenticated. If the received and calculated response codes are not equal at decision block 248, the process follows the NO path to function block 250 where the device authentication status is established as not authenticated. Actions may be taken by the authority 103 in response to the device authentication status will vary depending on the context of the authentication. For example, the authority 103 may allow the device 104 access to resources when the device 104 has been authenticated. The authority 103 may refuse further communication with the device 104 when the device 104 has not been authenticated.

Figure 6:
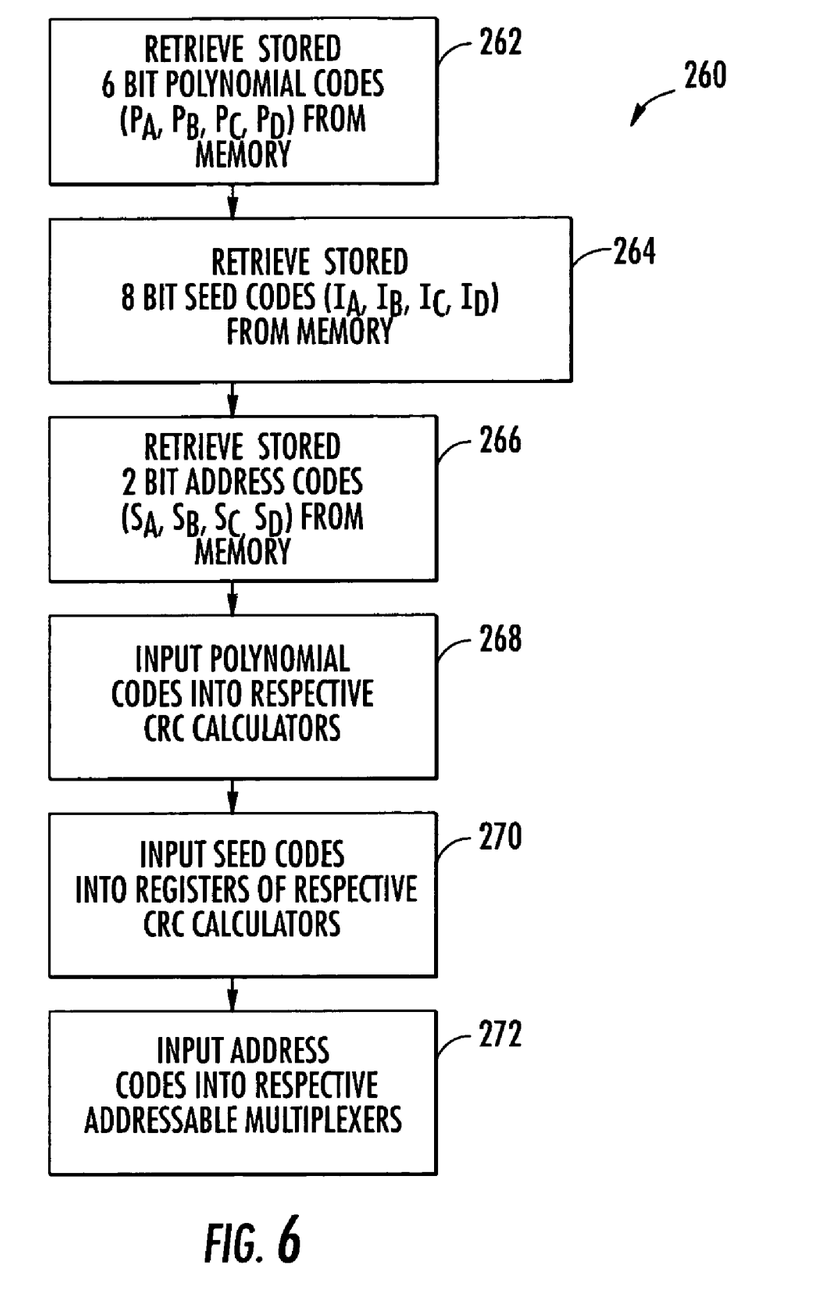
FIG. 6 illustrates a shift-register CRC calculator.

With reference to FIG. 6, a flow chart of a process 260 for initializing a response generator 112 is shown. The process begins in function block 262 as stored polynomial codes are retrieved from memory. In accordance with the disclosed embodiment, the stored polynomial code is represented as six-bit binary code, such that there are only two non-zero polynomial coefficients between the powers of 8 and 0. The coefficients of the 8 and zero powers are set to one. The first three bits of the six-bit binary code identify a negative feedback power and the second three bits of the six-bit binary code identify a positive feedback power. The stored polynomial code representations are translated to eight-bit polynomial codes $p_1$, $p_2$, $p_3$ and $p_4$.

The process proceeds to function block 264 as stored seed codes are retrieved from memory. In accordance with the disclosed embodiment, the stored seed codes are stored as eight-bit binary codes.

The process proceeds to function block 266 as stored address codes are retrieved from memory. In accordance with the disclosed embodiment, the stored address codes are stored as two-bit binary codes.

The process proceeds to function block 268 as the polynomial codes are input into the respective CRC calculators. In accordance with the disclosed embodiment, the stored polynomial codes are decoded before the polynomial codes are input into the respective CRC calculators. The CRC calculators may make the necessary assumptions so that the stored polynomial codes may be input directly into the CRC calculators.

The process proceeds to function block 270 as the seed codes are input into the registers of the respective CRC calculators. The process proceeds to function bock 272 as the stored address codes are input into the each of the respective multiplexers.

With reference to FIG. 7, a flow chart of a CRC algorithm suitable for the disclosed response generator 112 is shown. The process begins at function block 300 by initializing a counter. At decision block 302, the process determines if the counter has reached the number of bits in the challenge sequence. In the described embodiment, the number of bits in the challenge sequence is 32. If the counter has not reached 32, the process continues along the YES path to function block 304, where the counter is incremented. The process continues to function block 306 where the serial output bit of each CRC calculator is set equal to the most-significant bit (MSB) of the CRC calculator shift registers. At function block 308, the selected input bits of the addressable multiplexers are output to the CRC calculators. The process continues to function block 310 which shifts the data in the shift register to the right, placing the input bits into the least-significant-bits (LSB) of each shift register. For each shift register, at function block 312, the serial output bit is read. If the serial output bit is equal to one at decision block 314, the process continues along the YES path to function block 316 where the each register location is replaced by the XOR of the bit in the register location and the respective bit of the polynomial code. The process then returns to decision block 302 to determine if the counter has reached 32. If the serial output bit is equal to zero at decision block 314, the process follows the NO path and returns to decision block 302 to determine if the counter has reached 32.

If the counter has reached 32 at decision block 302, the process follows the YES path to function block 318. For each CRC calculator, the output sequence is set equal to the bits in the CRC calculator shift register. The process continues at function block 322 where the response is set equal to the XOR of the outputs from the CRC calculators.

It will be appreciated by those skilled in the art having the benefit of this disclosure that this invention provides a system and method of authentication. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An authentication system for authenticating a device to a host, comprising:
   a device input/output interface for communicating with the host;
   a device response generator for generating a challenge response responsive to a challenge received over the interface and locally stored seed values, the device response generator comprising:
   a plurality of multiplexers for connecting one of a plurality of inputs to the multiplexer to an output of the multiplexer responsive to a stored address code, each of the plurality of multiplexers having an input of the plurality of inputs connected to receive the challenge response;
   a plurality of hash function calculators each having an input connected to one of the plurality of multiplexers and a first output and a second output, the first output of each of the plurality of hash function calculators connected to at least two of the plurality of inputs of the plurality of multiplexers, each of the plurality of hash function calculators generating an output bit on each of the first output and the second output responsive to the challenge and the locally stored seed values;
   a logic circuit connected to each of the second outputs of the plurality of hash function calculators for combining the outputs of each of the plurality of hash function calculators into the challenge response; and
   a memory for storing the seed values and the address codes.

2. The authentication system of claim 1, wherein said device response generator performs a hash function on the challenge to generate a hash code.

3. The authentication system of claim 1, wherein said seed values include a polynomial code.

4. The authentication system of claim 1, wherein said seed values include initial register values.

5. The authentication system of claim 1, wherein the logic circuit comprises an exclusive OR circuit.

6. The authentication system of claim 1, wherein the plurality of hash function calculators comprise a plurality of CRC calculators.

7. The authentication system of claim 1, wherein the CRC calculators are implemented in a shift register.

8. An authentication system, comprising:
   a host device comprising:
   a first device input/output interface for communicating with a connected device;
   a first device response generator for generating a challenge response responsive to a challenge received over the interface and locally stored seed values, the device response generator comprising:
   a first plurality of multiplexers for connecting one of a plurality of inputs to the multiplexer to an output of the multiplexer responsive to a first stored address code, each of the first plurality of multiplexers having an input of the plurality of inputs connected to receive the first challenge response;
   a first plurality of hash function calculators each having an input connected to one of the plurality of multiplexers and a first output and a second output, the first output of each of the first plurality of hash function calculators connected to at least two of the plurality of inputs of the first plurality of multiplexers, each of the first plurality of hash function calculators generating an output bit on each of the first output and the second output responsive to the challenge and the locally stored seed values;
   a first logic circuit connected to each of the second outputs of the first plurality of hash function calculators for combining the outputs of each of the first plurality of hash function calculators into the first challenge response;
   a first memory for storing the seed values and the address codes;
   a connected device comprising:
   a second device input/output interface for communicating with the host;
   a second device response generator for generating a challenge response responsive to a challenge received over the interface and locally stored seed values, the device response generator comprising:
   a second plurality of multiplexers for connecting one of a plurality of inputs to the multiplexer to an output of the multiplexer responsive to a stored address code, each of the second plurality of multiplexers having an input of the plurality of inputs connected to receive the second challenge response;

a second plurality of hash function calculators each having an input connected to one of the second plurality of multiplexers and a first output and a second output, the first output of each of the second plurality of hash function calculators connected to at least two of the plurality of inputs of the second plurality of multiplexers, each of the second plurality of hash function calculators generating an output bit on each of the first output and the second output responsive to the challenge and the locally stored seed values;

a second logic circuit connected to each of the second outputs of the second plurality of hash function calculators for combining the outputs of each of the second plurality of hash function calculators into the second challenge response;

a second memory for storing the seed values and the address codes; and wherein the host device compares the first challenge response with the second challenge response to determine whether to authenticate the connected device.

9. The authentication system of claim 8, wherein the first and second logic circuits comprise an exclusive OR circuit.

10. The authentication system of claim 8, wherein the plurality of hash function calculators comprise a plurality of CRC calculators.

11. The authentication system of claim 10, wherein the CRC calculators are implemented in a shift register.

* * * * *